United States Patent
Kotecha et al.

(10) Patent No.: US 9,781,541 B2
(45) Date of Patent: Oct. 3, 2017

(54) FACILITATING COMMUNICATION BETWEEN A USER DEVICE AND A CLIENT DEVICE VIA A COMMON SERVICES PLATFORM

(71) Applicant: Verizon Patent and Licensing Inc., Basking Ridge, NJ (US)

(72) Inventors: Lalit R. Kotecha, San Ramon, CA (US); Chris S. Neisinger, Danville, CA (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 735 days.

(21) Appl. No.: 13/950,743

(22) Filed: Jul. 25, 2013

(65) Prior Publication Data

US 2015/0032799 A1  Jan. 29, 2015

(51) Int. Cl.
*G06F 15/16* (2006.01)
*H04W 4/00* (2009.01)
*H04L 29/08* (2006.01)

(52) U.S. Cl.
CPC .......... *H04W 4/001* (2013.01); *H04L 67/125* (2013.01); *H04L 67/2842* (2013.01)

(58) Field of Classification Search
None
See application file for complete search history.

(56) References Cited

U.S. PATENT DOCUMENTS

| | | | | |
|---|---|---|---|---|
| 9,183,590 | B2* | 11/2015 | Angelone | G06Q 40/02 |
| 2006/0126603 | A1* | 6/2006 | Shimizu | H04L 12/12 370/356 |
| 2008/0259919 | A1* | 10/2008 | Monga | H04L 43/12 370/389 |
| 2009/0046732 | A1* | 2/2009 | Pratt, Jr. | H04L 12/66 370/406 |
| 2009/0059786 | A1* | 3/2009 | Budampati | H04L 45/00 370/230 |
| 2009/0097623 | A1* | 4/2009 | Bharadwaj | H04M 11/027 379/106.02 |
| 2010/0168536 | A1* | 7/2010 | Banet | A61B 5/0002 600/326 |
| 2012/0089369 | A1* | 4/2012 | Abuzeni | H04L 67/12 702/188 |

(Continued)

*Primary Examiner* — Joshua Joo

(57) ABSTRACT

A server may receive provisioning information for a client device; provision, based on the provisioning information, the client device to prepare the client device to gather data to form a data record and communicate with a user device, via the server, to receive or transmit information relating to the data record; and receive a communication request from the user device via a first network. The communication request may include a request to transmit the information relating to the data record to or from the client device. The server may communicate with the client device via a second network, on behalf of the user device, to process the communication request based on authorizing the user device. The second network may be different from the first network. The server may provide a response to the communication request to the user device. The response may include the information relating to the data record.

20 Claims, 7 Drawing Sheets

(56) References Cited

U.S. PATENT DOCUMENTS

| | | | | |
|---|---|---|---|---|
| 2012/0271548 A1* | 10/2012 | Koehler | ............... | G01D 3/08 |
| | | | | 702/1 |
| 2012/0317237 A1* | 12/2012 | Kazan | ............... | G06F 9/54 |
| | | | | 709/219 |
| 2013/0312066 A1* | 1/2013 | Suarez | ............... | G06F 19/3418 |
| | | | | 726/4 |
| 2013/0094444 A1* | 4/2013 | Lai | ............... | H04W 8/265 |
| | | | | 370/328 |
| 2013/0124736 A1* | 5/2013 | Park | ............... | H04L 67/12 |
| | | | | 709/227 |
| 2014/0085080 A1* | 3/2014 | Carnes | ............... | A61B 5/746 |
| | | | | 340/539.12 |
| 2014/0152466 A1* | 6/2014 | Wiesner | ............... | G06F 19/3418 |
| | | | | 340/870.07 |
| 2014/0266684 A1* | 9/2014 | Poder | ............... | G08B 25/003 |
| | | | | 340/521 |
| 2014/0349660 A1* | 11/2014 | Abdalla | ............... | H04W 4/005 |
| | | | | 455/450 |
| 2015/0206408 A1* | 7/2015 | LaLonde | ............... | A61N 1/37282 |
| | | | | 340/539.12 |

\* cited by examiner

FACILITATING COMMUNICATION BETWEEN A USER DEVICE AND A CLIENT DEVICE VIA A COMMON SERVICES PLATFORM

BACKGROUND

Client devices (e.g., machine-to-machine (M2M) devices or the like) are sometimes used to gather data via one or more sensors and provide the data via a service provider network. A client device can be provisioned to gather data, provide the data, and/or authorize access of the client device by particular users. Individually provisioning multiple client devices can be costly and time consuming. Also, providing direct access to the client device can expose the client device and/or the data gathered by the client device to security risks.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a technique to allow a user to securely access data captured by a client device (e.g., a machine-to-machine (M2M) device, and/or some other device). In some implementations, the systems and/or methods may further provide a technique to allow a user to securely access, provision, control, and/or manage the client device via a common services platform.

Figure 1:
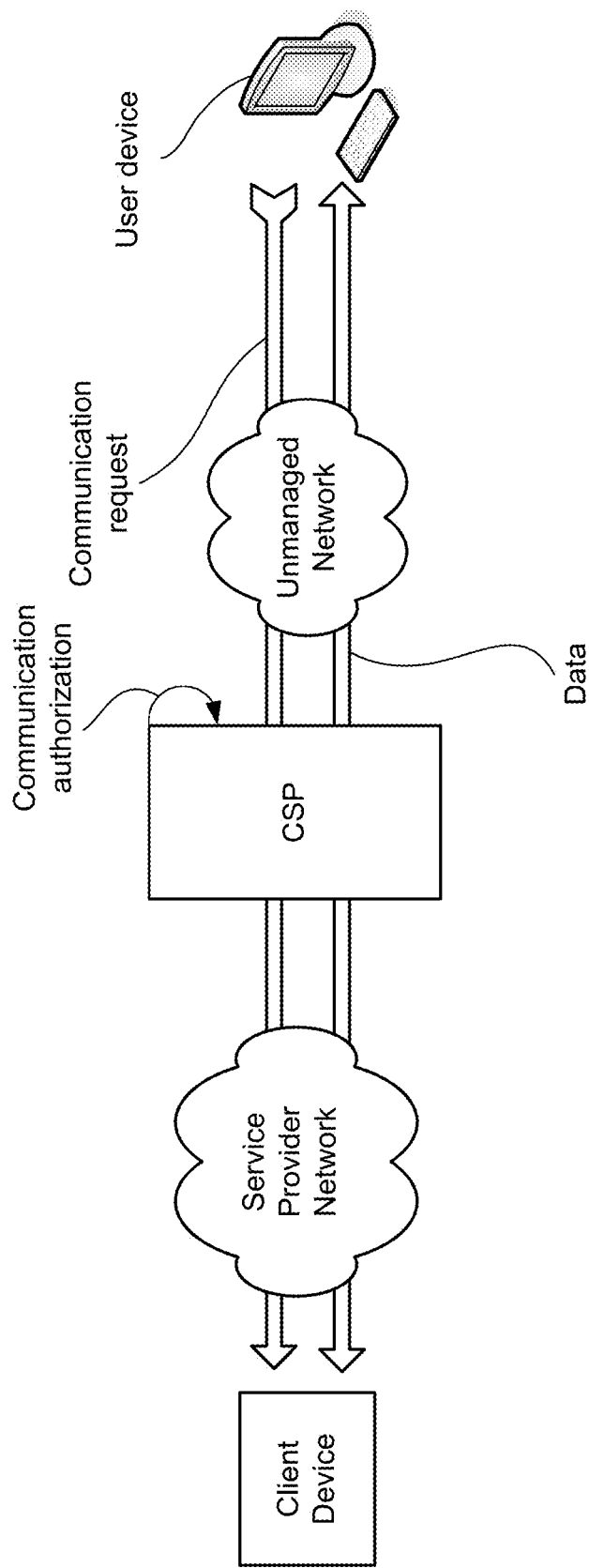
FIG. 1 illustrates an example overview of an implementation described herein.

FIG. 1 illustrates an example implementation as described herein. In FIG. 1, a client device may form data records by gathering data via one or more sensor/metering devices associated with the client device. As shown in FIG. 1, the client device may connect to a service provider network (e.g., a wide area network (WAN), a cellular network, and/or some other type of network) to connect to a common services platform (CSP). In some implementations, the CSP may store access information for the client device that identifies users that may communicate with the client device (e.g., based on login credentials, a device identifier (ID) of a user device used to communicate with the client device, based on a location of the user device, etc.) in order to transmit/receive information relating to data records formed by the client device.

For example, an authorized user (e.g., via a user device) may transmit a request to receive data records, a control instruction that adjusts a sensor/metering device of the client device and/or adjusts how data is gathered by the client device, a processing instruction that identifies how data gathered by the client device is processed, a transmission instruction that identifies when data is to be transmitted and/or users that may receive the data, and/or some other information relating to data records formed by the client device.

In some implementations, a user device may provide a communication request to the CSP (e.g., via an unmanaged network, such as the Internet). In some implementations, the communication request may include an ID of the client device and a request to communicate with the client device corresponding to the ID. In some implementations, the communication request may further include authorization information that the CSP may use to allow the user to communicate with the client device (e.g., credentials regarding a user of the user device, a device ID of the user device, a location of the user device, etc.).

In FIG. 1, assume that the CSP stores access information that permits the user device to access the client device. Given this assumption, and based on receiving the communication request, the CSP may authorize the user device to access the client device. In some implementations, the CSP may transmit data flows to/from the client device and the user device. In some implementations, the data flows may correspond to a request for data gathered by the client device, a control instruction for the client device, a device management instruction for the client device, and/or some other instruction for the client device. In some implementations, the user device may provide provisioning information to direct the CSP to provision the client device. In some implementations, the provisioning information may include information identifying data that the client device is to gather, applications that the client device may execute to process the data, particular users that may receive the data, times at which the client device may provide the data, and/or some other information that identifies how the client device may be provisioned.

In some implementations, the client device may not be directly accessible from the unmanaged network, thereby providing a layer of security for the client device. For example, the client device may be accessed via the service provider network which the user device may access via the CSP. In some implementations, the CSP can be used to transmit data flows to/from the client device (e.g., provisioning information, control instructions, data gathered by the client device, etc). As a result, the CSP may provide secure access to the client device and may concurrently provision multiple client devices, thereby reducing labor and costs associated with separately provisioning tens of thousands to millions of client devices.

Figure 2:
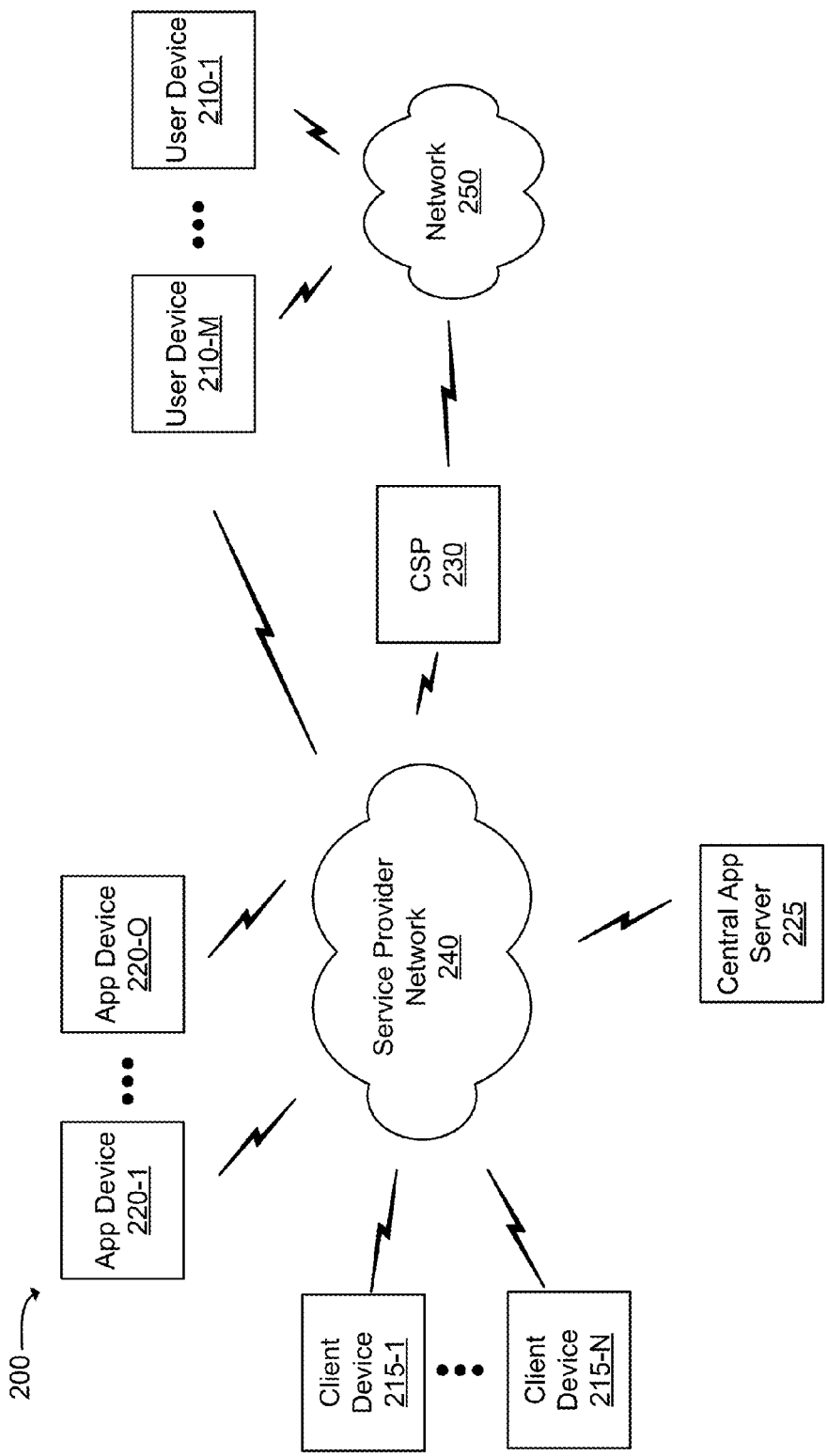
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), client devices 215-1 . . . , 215-N (where N≥1), application (app) devices 220-1, . . . , 220-O (where O≥1), central app server 225, CSP 230, service provider network 240, and network 250.

User device 210 may include any device capable of communicating via a network, such as service provider network 240 and/or network 250. For example, user device 210 may correspond to a mobile communication device (e.g., a smart phone or a personal digital assistant (PDA)), a portable computer device (e.g., a laptop or a tablet computer), a desktop computing device, a server device, or some other computing device.

In some implementations, user device 210 may provide a communication request to receive data gathered by client device 215 and/or processed by app device 220, provide a control instruction to client device 215, provide a management instruction to client device 215 (e.g., an instruction to read/write particular data from/to client device 215, an instruction to modify how client device 215 is gather/transmit data, etc.), and/or provide another communication to client device 215. For example, user device 210 may provide the communication request via an application programming interface (API), a web portal, or the like.

In some implementations, user device 210 may correspond to a web server device that may receive data gathered by client device 215 and/or processed by app device 220 and may store the data for publishing to a web site or the like.

In some implementations, user device 210 may correspond to an operator user device 210 to provide provisioning information to CSP 230 to direct CSP 230 to provision client device 215 and/or to register client device 215 with a particular entity (e.g., a user, an organization, a company, a facility, etc.). In some implementations, user device 210 may provide provisioning information for multiple client devices 215 to direct CSP 230 to concurrently provision multiple client devices.

Client device 215 may include one or more machine-to-machine (M2M) devices capable of communicating via a network. For example, client device 215 may include a network device (e.g., a modem, a switch, a gateway, etc.), a sensing device, a processing device, a metering device, and/or some other type of device. In some implementations, client device 215 may include a sensing or metering device to gather data and form a data record associated with the data. For example, a data record may include a temperature measurement, a resource usage measurement, a motion detection indication, an object detection indication, a facility intrusion detection indication, or some other measurement and/or indication. In some implementations, each data record may include a timestamp, information identifying a particular sensing/metering device of client device 215 used to gather the data in the data record, information regarding a particular product associated with the data, information regarding a particular facility associated with the data, information regarding a particular geographic location associated with the data, and/or some other information regarding the data.

In some implementations, data records may be used to aid in an analysis. For example, the data records may be used to aid in a sales trend analysis, a resource usage analysis, a product interest level trends analysis (e.g., to provide targeted advertising based on product interest), and/or some other type of analysis. Additionally, or alternatively, the data records may be used for some other purpose. For example, the data records may be used to alert a user of the occurrence of an event (e.g., a facility intrusion event, an event that identifies when resources have dropped below a particular threshold, and/or some other type of event).

In some implementations, client device 215 may further include a processing device to process the data to form processed data (e.g., via an application implemented on client device 215 and/or implemented on app device 220), and/or a network device to provide a data flow (including the processed data) towards app device 225, user device 210, and/or some other destination.

In some implementations, client device 215 may provide a data flow including a control instruction (e.g., an instruction to adjust a sensor position/configuration and/or some other type of instruction to adjust how client device 215 is to gather data) to another client device 215. In some implementations, user device 210 may be used to receive data gathered by client device 215 (e.g., data records) and/or to send a control instruction to client device 215. In some implementations, client device 215 may include another type of device that gathers, stores, processes, and/or transmits data.

In some implementations, user device 210 may function as client device 215. In some implementations, client device 215 may function as user device 210. In some implementations, user device 210 or client device 215 may function as both user device 210 and client device 215.

App device 220 may include a computing device, such as a server device, a desktop computing device, a portable computing device (e.g., a laptop, a tablet, a mobile phone, etc.), an M2M device, and/or some other type of computing device. In some implementations, app device 220 may include one or more applications that receive data gathered by a sensor device of client device 215 and may form processed data associated with the data. For example, the processed data may correspond to a data analysis associated with the data, such as a temperature trends analysis, an inventory analysis, a sales trend analysis, etc. In some implementations, app device 220 may provide a control instruction to client device 215 (e.g., an instruction to adjust a sensor position/configuration and/or some other type of instruction). In some implementations, app device 220 may be accessed via service provider network 240 (e.g., to provide security in accessing app device 220). In some implementations, app device 220 may be included in client device 215 or may be provided externally to client device 215.

Central app server 225 may include a server device or a collection of server devices. In some implementations, central app server 225 may process a request for data gathered by one or more client devices 215 and/or processed by one or more app devices 220. For example, central app server 225 may receive a request for the data (e.g., from user device 210 via CSP 230), identify particular app devices 220 and/or particular client devices 215 associated with the data, receive the data from the particular app devices 220 and/or particular client devices 215, and provide the data to user device 210 (e.g., via CSP 230).

CSP 230 may include a server device or a collection of server devices. In some implementations, CSP 230 may receive a request, from user device 210, to communicate with client device 215. In some implementations, CSP 230 may authenticate user device 210 to communicate with client device 215 and may provide data flows to client device 215 on behalf of user device 210 (e.g., to prevent direct access of client device 215 by user device 210). Additionally, or alternatively, CSP 230 may receive provisioning information for client device 215 and may provision client device 215 to prepare client device 215 to gather, process, and/or provide data. In some implementations, CSP 230 may receive provisioning information for multiple client devices 215 to concurrently provision the multiple client devices 215.

Service provider network 240 may include one or more wired and/or wireless networks. For example, service provider network 240 may include a cellular network, a public land mobile network (PLMN), and/or a cellular network (e.g., a second generation (2G) network, a third generation (3G) network, a fourth generation (4G) network, a fifth generation (5G) network, a long term evolution (LTE) network, etc.). Additionally, or alternatively, service provider network 240 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

In some implementations, service provider network 240 may include an evolved packet core (EPC) having a serving gateway (SGW), a packet data network (PDN) gateway (PGW), a mobile management entity (MME) device, and/or some other device to transmit data flows to/from user device 210 and/or client device 215. In some implementations, service provider network 240 may include a private EPC that prevents direct access of client device 215 and/or app device 225 (e.g., by user device 210). For example, the private EPC may communicate with an authorized device (e.g., CSP 230) such that CSP 230 may process communications between client device 215, app device 225, and user device 210.

Network 250 may include one or more wired and/or wireless networks. For example, network 250 may include a cellular network, a public land mobile network (PLMN), a second generation (2G) network, a third generation (3G) network, a fourth generation (4G) network, a fifth generation (5G) network, and/or another network. Additionally, or alternatively, network 250 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
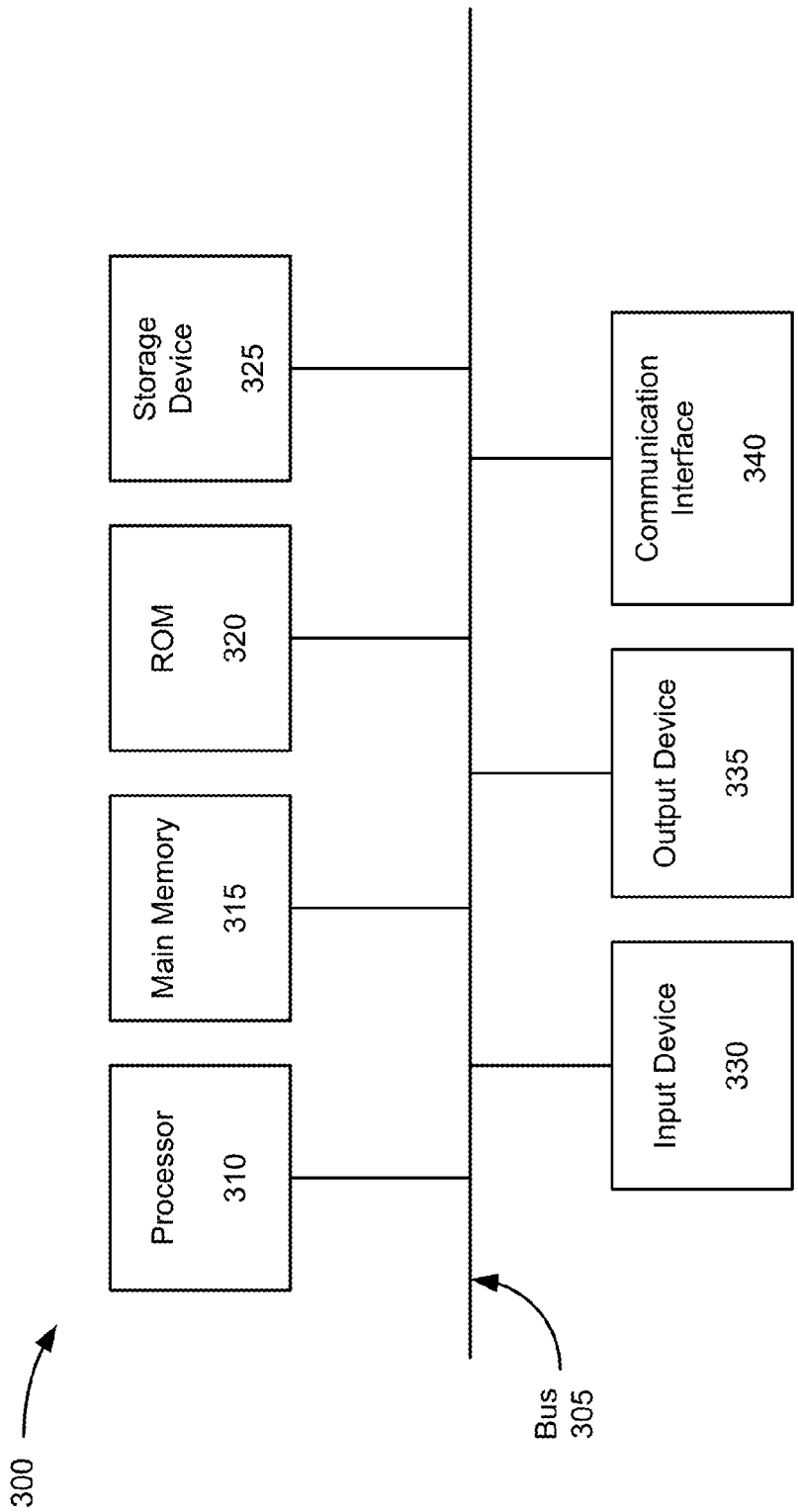
FIG. 3 illustrates example components of a device that may be used within the environment of FIG. 2.

FIG. 3 illustrates example components of a device 300 that may be used within environment 200 of FIG. 2. Device 300 may correspond to user device 210, client device 215, app device 220, central app server 225, and/or CSP 230. Each of user device 210, client device 215, app device 220, central app server 225, and/or CSP 230 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
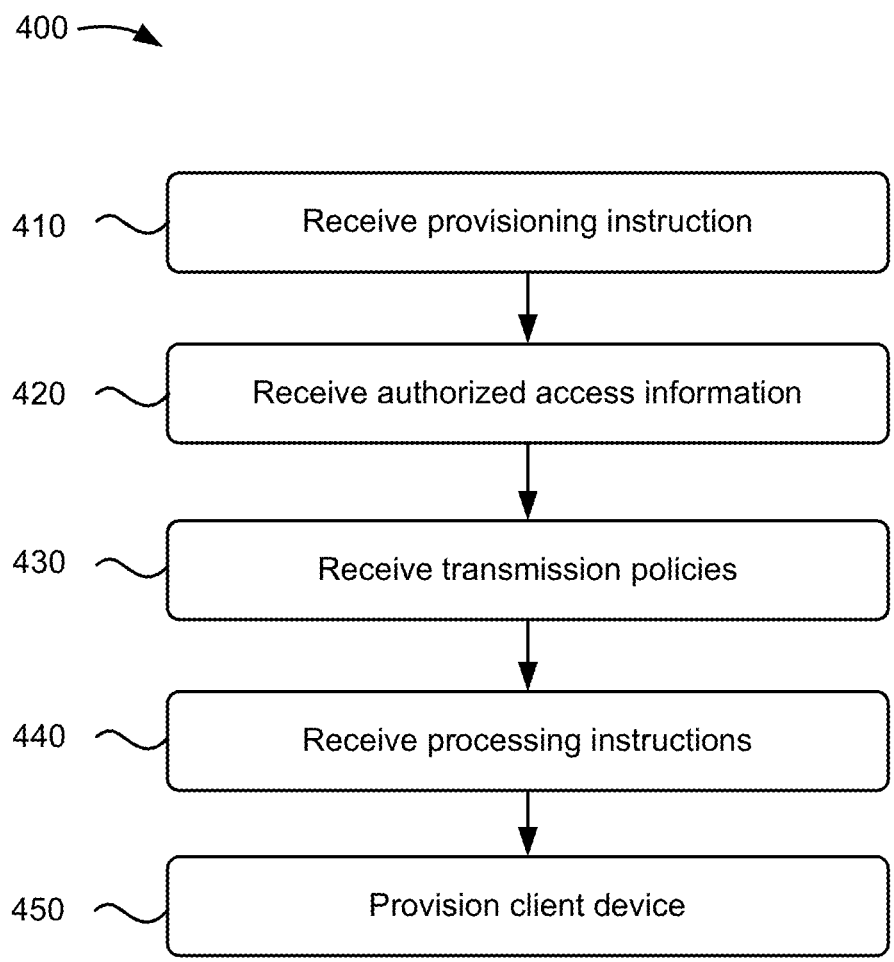
FIG. 4 illustrates a flowchart of an example process for provisioning a client device.

FIG. 4 illustrates a flowchart of an example process 400 for provisioning a client device. In some implementations, process 400 may be performed by one or more components of CSP 230. In some implementations, some or all of blocks of process 400 may be performed by one or more components of another device in environment 200 (e.g., user device 210, client device 215, app device 220, and/or central app server 225), or a group of devices including or excluding CSP 230.

As shown in FIG. 4, process 400 may include receiving a provisioning instruction (block 410). For example, CSP 230 may receive the provisioning instruction from user device 210 (e.g., an operator user device 210). In some implementations, the provisioning instruction may include an identifier of client device 215 and an instruction to provision client device 215 to prepare client device 215 to gather and transmit data. Additionally, or alternatively, the provisioning instruction may include an instruction to register client device 215 with a particular entity (e.g., a user, an organization, a company, a facility, or the like).

Process 400 may also include receiving and storing authorized communication information (block 420). For example, CSP 230 may receive the authorized access information from user device 210 (e.g., based on receiving the provisioning instruction). In some implementations, the authorized communication information may identify particular user devices 210 that may communicate with client device 215 (e.g., based on a device ID, geographic location information associated with the particular user devices 210, login credentials associated with the particular user devices 210, or the like). In some implementations, the authorized communication information may include information identifying particular times at which the particular user devices 210 may communicate with client device 215. As described in greater detail below, CSP 230 may authorize a communication between user device 210 and client device 215 (e.g., via CSP 230) based on the authorized communication information.

Process 400 may further include receiving transmission policies (block 430). For example, CSP 230 may receive the transmission policies from operator user device 210. In some implementations, the transmission policies may include bearer policies, such as QoS policies for a bearer via which data flows are to be transmitted to/from client device 215. Additionally, or alternatively, the transmission policies may include transmission instructions, such as times at which data gathered by client device 215 is to be transmitted, recipients that may receive the data gathered by client device 215, and/or some other transmission instruction.

In some implementations, the transmission policies may be based on a class of data corresponding to a particular sensor of client device 215. For example, data gathered by a first sensor of client device 215 may correspond to "class 1" data, whereas data gathered by a second sensor of client device 215 may correspond to "class 2" data. As described in greater detail with respect to FIG. 5, a particular data class may correspond to a particular transmission policy. That is, class 1 data may be associated with a different transmission policy than class 2 data. In some implementations, a class may relate to network resources that are to be provided to transmit a data flow.

In some implementations, an operator may communicate with CSP 230 (e.g., via a web portal using operator user device 210) to select transmission polices based on charges that an operator or user of client device 215 may be willing to incur. In some implementations, the transmission policies may affect charges associated with transmitting a data flow. For example, the charges may be based on the QoS policies and/or based on a time of day in which data is transmitted (e.g., lower charges when data is transmitted at off-peak times).

Process 400 may further include receiving processing instructions (block 440). For example, CSP 230 may receive the processing instructions from operator user device 210. In some implementations, the processing instructions may identify particular sensors/meters of client device 215 that client device 215 may use to gather data, times in which client device 215 is to gather data, and/or applications that client device 215 may execute to process gathered data (e.g., to form processed data). Additionally, or alternatively, the processing instructions may identify particular app devices 220 that may receive data gathered by client device 215 to form processed data.

In some implementations, an operator may communicate with CSP 230 (e.g., via a web portal using operator user device 210) to select processing instructions based on charges that an operator or user of client device 215 may be willing to incur. In some implementations, the processing instructions may affect charges associated with processing data gathered by client device 215. For example, the charges may be based a complexity of an algorithm used to process the data, a particular application used to process the data, a particular app device 220 used to process the data, and/or based on some other factor associated with processing the data.

In some implementations, the authorized access information, the transmission policies, and/or the processing instructions may correspond to provisioning information that CSP 230 may use to provision client device 215.

Process 400 may also include provisioning the client device (block 450). For example, CSP 230 may provision client device 215 based on receiving the provisioning instruction and/or the provisioning information (e.g., the authorized access information, the transmission policies, the processing instructions, and/or some other information that may prepare client device 215 to gather and/or transmit data). In some implementations, CSP 230 may provision client device 215 via central app server 225. Alternatively, CSP 230 may provision client device 215 independently of central app server 225.

In some implementations, CSP 230 may install an application on client device 215 (e.g., by providing an image having the application to client device 215), for example, when the processing instructions identify that client device 215 is to use the application to process data gathered by client device 215, and when client device 215 does not include the application or when the application is out of date (e.g., based on a version number of the application). In some implementations, CSP 230 may provide the processing instructions to client device 215 to direct client device 215 to process data using a particular application and/or to provide data, gathered by client device 215, to a particular app device 220 for processing.

In some implementations, CSP 230 may provide client device 215 with a transmission instruction (e.g., corresponding to the transmission policies) that identifies when client device 215 is to transmit data gathered by client device 215, a recipient of the data, and/or some other transmission instruction. In some implementations, CSP 230 may provide client device 215 with an indication that client device 215 is provisioned such that client device 215 may gather data, process data, and/or provide data.

In some implementations, CSP 230 may link with a database or repository that stores provisioning information associated with client device 215. In some implementations, CSP 230 may receive updates to the provisioning information and may re-provision client device 215 based on the updates.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel. Also, in some implementations, some of the blocks may be omitted. In some implementations, CSP 230 may receive provisioning instructions for multiple client devices 215 (e.g., in accordance with block 410) to concurrently provision the multiple client devices 215 (e.g., in accordance with process 400).

Figure 5:
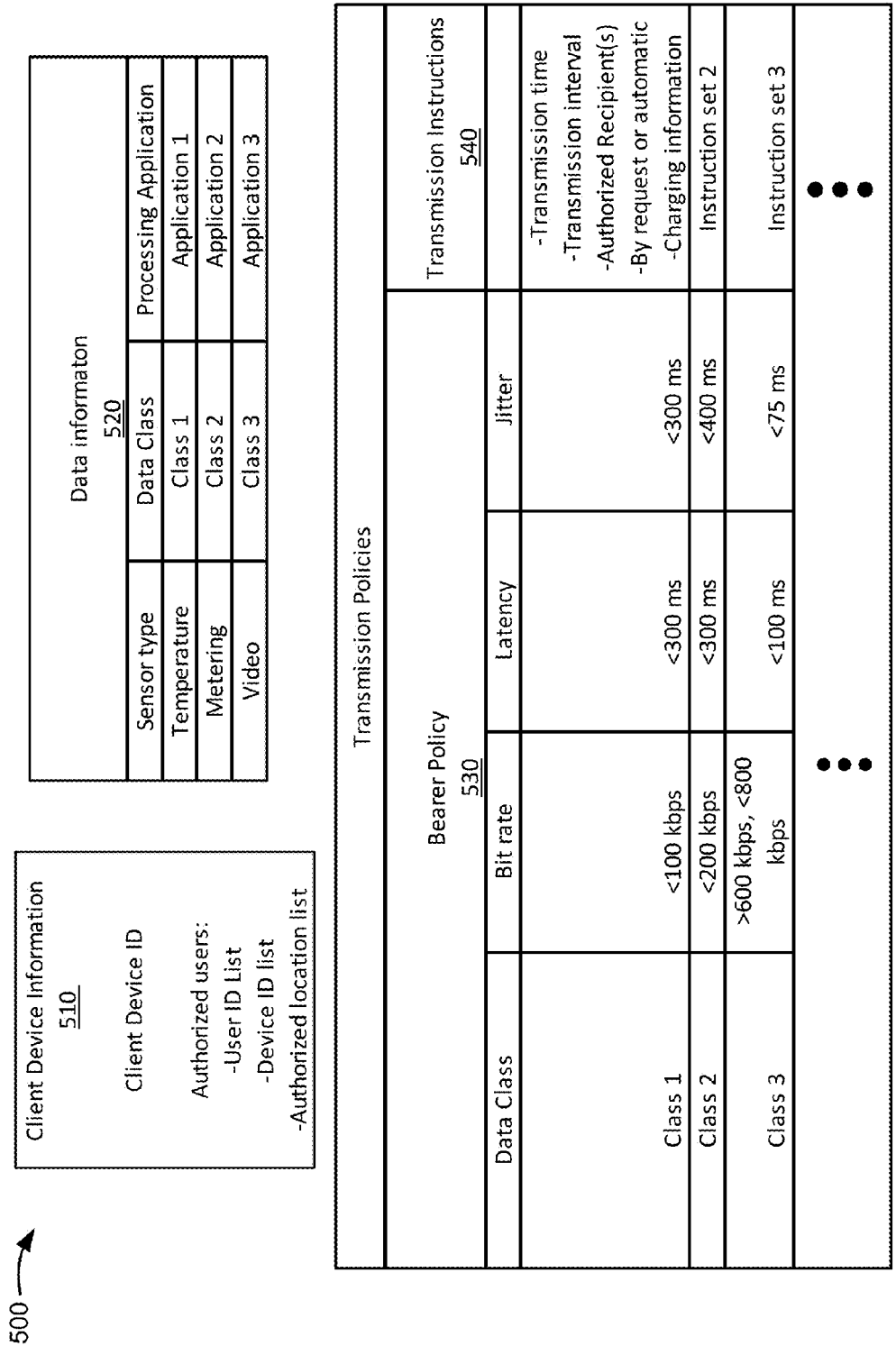
FIG. 5 illustrates an example data structure that may be stored by one or more devices in the environment of FIG. 2.

FIG. 5 illustrates an example data structure 500 that may be stored by one or more devices in environment 200, such as CSP 230 and/or client device 215. In some implementations, data structure 500 may be stored in a memory of CSP 230 and/or client device 215. In some implementations, data structure 500 may be stored in a memory separate from, but accessible by, CSP 230 and/or client device 215. In some implementations, data structure 500 may be stored by some other device in environment 200, such as user device 210, app device 220, and/or central app server 225.

A particular instance of data structure 500 may contain different information and/or fields than another instance of data structure 500. One instance of data structure 500 may store provisioning information and transmission policy information regarding one client device 215 in environment 200, whereas another instance of data structure 500 may store provisioning information and transmission policy information regarding another client device 215 in environment 200.

As shown in FIG. 5, data structure 500 may include client device information field 510, data information field 520, bearer policy field 530, and transmission instructions field 540.

Client device information field 510 may include information that identifies a particular client device 215 associated with a particular instance of data structure 500. For example, client device information field 510 may store an identifier of client device 215 (e.g., a serial number, a broadcast identifier, a network address, or the like). Additionally, or alternatively, client device information field 510 may store information that identifies authorization information that CSP 230 may use to authorize a communication between user device 210 and client device 215. For example, client device information field 510 may include a list of user IDs, a list of device IDs, a list of geographic locations, and/or some other information/list that CSP 230 may use to authorize user device 210 to communicate with client device 215. In some implementations, the lists may be white lists and/or black lists.

As an example, assume that user device 210 provides a communication request to CSP 230 to request to communicate with client device 215. In some implementations, the communication request may include a user ID, a device ID, information identifying a location of user device 210, and/or some other authorization/authentication related information (e.g., biometrics information, a security key, a password, etc.). Based on the information included in the communication request, CSP 230 may authorize user device 210 to communicate with client device 215 when the information included in the communication request matches the information stored by client device information field 510. In some implementations (e.g., when less than all of the information in the communication request matches the information stored by client device information field 510), CSP 230 may allow partial access to client device 215 (e.g., to allow CSP 230 to receive a particular subset of data gathered by client device 215) or may deny access to client device 215 completely.

In some implementations, client device information field 510 may also include information identifying tasks that user device 210 may perform. For example, client device information field 510 may identify particular user devices 210 that may provide a particular control instruction and/or a particular management instruction to client device 215. Additionally, or alternatively, client device information field 510 may identify particular user devices 210 that may provide provisioning information and/or updates to provisioning information for client device 215 (e.g., processing instructions, transmission policies, etc.).

Data information field 520 may store information identifying data gathered by client device 215. For example, data information field 520 may store information identifying one or more sensors implemented by client device 215, a data class associated with data gathered by a sensor of client device 215, an application used to process data gathered by a sensor of client device 215, and/or some other information associated with data gathered by client device 215. For example, assume that client device 215 includes a temperature sensor. Further, assume that data gathered by the temperature sensor is categorized as class 1 data. Further, assume that client device 215 is to use application 1 to process data gathered by the temperature sensor. Given these assumptions, data information field 520 may store information to identify that client device 215 includes a temperature sensor and that the data gathered by the temperature sensor is categorized as class 1 data and is processed using application 1. In some implementations, data information field 520 may store information identifying a particular app device 220 with which client device 215 may provide data for data processing. As described below, the data class may correspond to a particular transmission policy. That is, class 1 data may be associated with a different transmission policy than class 2 data.

In some implementations, an operator may communicate with CSP 230 (e.g., via a web portal using operator user device 210) to select processing instructions based on charges that an operator or user of client device 215 may be willing to incur. In some implementations, the processing instructions may affect charges associated with processing data gathered by client device 215. For example, the charges may be based on a complexity of an algorithm used to process the data, a particular application used to process the data, a particular app device 220 used to process the data, and/or some other factor associated with processing the data. In some implementations, information stored by data information field 520 may be based on the processing instructions selected by the operator.

Bearer policy field 530 and transmission instructions field 540 may store transmission policies for data gathered by client device 215. As shown in FIG. 5, a transmission policy may be based on a data class. Bearer policy field 530 may store information identifying how a data flow, corresponding to the transmission of data gathered by client device 215, is to be treated (e.g., network resources that may be provided to transmit the data flow). For example, bearer policy field 530 may store information that identifies QoS policies for a bearer that is to transmit the data flows. As an example, assume that class 1 data is to be transmitted via a bearer that provides less than a 100 kilobits per second (kbps) bit rate, less than 300 ms of latency, and less than 300 ms of jitter. Given these assumptions, bearer policy field 530 may store information that identifies that class 1 data is to be transmitted via a bearer that provides less than a 100 kilobits per second (kbps) bit rate, less than 300 milliseconds (ms) of latency, and less than 300 ms of jitter.

Transmission instructions field 540 may store information that identifies instructions for transmission of data gathered by client device 215. For example, transmission instructions field 540 may store information that identifies a time at which data is to be transmitted, an interval (e.g., a frequency) at which the data is to be transmitted, a recipient that may receive/access the data (e.g., based on an IP address of the recipient, a short message service (SMS) address of the recipient, an e-mail address of the recipient, or the like), and whether the data is to be provided based on receiving a request or provided automatically. For example, the data may be provided automatically at a particular time and/or at a particular frequency. Additionally, or alternatively, the data may be provided based on an alert that is triggered when the value of the data satisfies a particular threshold. As an example, an alert may trigger when a temperature sensor detects a temperature that exceeds or drops below a particular threshold. Additionally, or alternatively, the alert may trigger when a motion detector detects a motion, when a meter detects that a resource level drops below a particular threshold, when a facility alarm switch is triggered based on unauthorized access, etc. In some implementations, data may be transmitted at off-peak times in order to reduce network load and to reduce costs associated with transmitting the data.

As described above, transmission instructions field 540 may store information that identifies recipients that may receive/access data gathered by client device 215. For example, transmission instructions field 540 may store information identifying particular user devices 210 that may receive the data. Additionally, or alternatively, transmission instructions field 540 may store information that identifies that data of a particular class may be made public and may be made available to any user device 210.

In some implementations, transmission policies stored by bearer policy field 530 and/or transmission instructions field 540 may be based on a subscription level of client device 215 and/or a subscription level of a user of client device 215. For example, different bearer policies and different transmission instructions may be associated with users of different subscription levels.

In some implementations, an operator user device 210, associated with client device 215, may communicate with CSP 230 (e.g., via a web portal) to select transmission polices based on charges that an operator or user of client device 215 may be willing to incur. In some implementations, information stored by bearer policy field 530 and/or transmission instructions field 540 may be based on the transmission policies selected by the operator.

In some implementations, information stored by data structure 500 may correspond to provisioning information received by CSP 230 in blocks 420-440 of process 400. In some implementations, information stored by data structure 500 may be received from an operator user device 210 associated with client device 215, a repository that stores provisioning information for client device 215, and/or a computer file (e.g., an image) that CSP 230 may receive (e.g., from the operator user device 210, from a storage medium of CSP 230, and/or from some other source). In some implementations, CSP 230 may provision client device 215 based on information stored by data structure 500 (e.g., in accordance with process 400). For example, CSP 230 may install/update applications that client device 215 is to use to process data gathered by client device 215 (e.g., based on information stored by data information field 520) and/or to direct client device 215 to provide data to a particular app device 220 for data processing. Additionally, or alternatively, CSP 230 may provide transmission instructions to client device 215 to cause client device 215 to transmit particular data in accordance with the transmission instructions.

While particular fields are shown in a particular format in data structure 500, in practice, data structure 500 may include additional fields, fewer fields, different fields, or differently arranged fields than are shown in FIG. 5. Also, FIG. 5 illustrates examples of information stored by data structure 500. In practice, other examples of information stored by data structure 500 are possible. For example, data structure 500 may store billing information that identifies charges associated with providing data gathered by client device 215. In some implementations, the charges may be based on the bearer policies and/or the transmission instructions. For example, the charges may be based on the time of day at which data is transmitted (e.g., lower charges for data transmitted at off-peak times).

Figure 6:
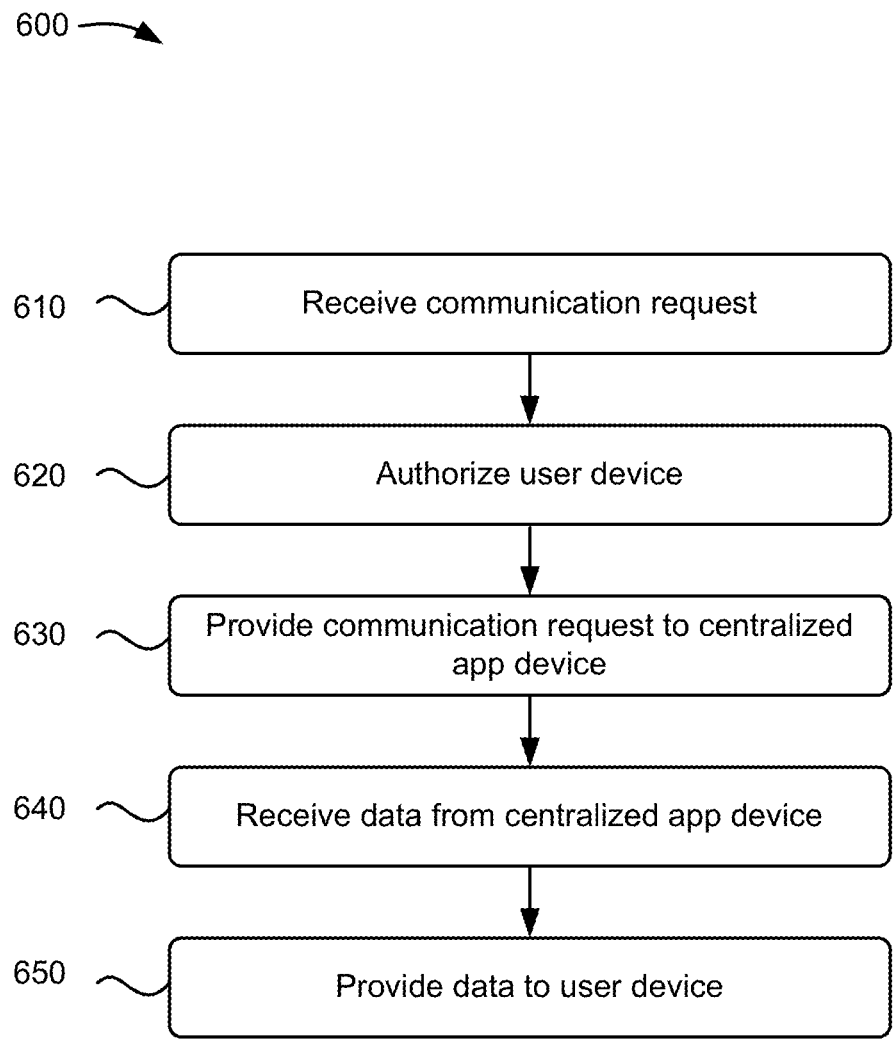
FIG. 6 illustrates a flowchart of an example process for facilitating communication between a user device and a client device via a common services platform.

FIG. 6 illustrates a flowchart of an example process 600 for facilitating communication between a user device and a client device via a common services platform. In some implementations, process 600 may be performed by one or more components of CSP 230. In some implementations, some or all of blocks of process 600 may be performed by one or more components of another device in environment 200 (e.g., app device 220 and/or central app server 225), or a group of devices including or excluding CSP 230.

As shown in FIG. 6, process 600 may include receiving a communication request (block 610). For example, CSP 230 may receive the communication request from user device 210 (e.g., via a web portal, an application, or some other technique). As described above, the communication request may include an ID of client device 215, a request to communicate with client device 215, and/or information that CSP 230 may use to authorize user device 210 to communicate with client device 215 (e.g., a user ID, a device ID, information identifying a location of user device 210, biometrics information, a security key, a password, and/or some other authorization/authentication related information).

In some implementations, the communication request may include information relating to a data record formed by client device 215. For example, the communication request may include a data request for particular data records, associated with client device 215, that meet particular criteria. For example, the criteria may include a timeframe at which data was gathered by client device 215 (e.g., based on a timestamp of a data record), product information associated with the data record, a measurement value (or range of values) associated with the data record, information identifying a geographic location associated with the data record, and/or some other criteria associated with the data record. In some implementations, a data request may include a particular complexity measurement (e.g., based on the number of criteria used to identify data records). In some implementations, the criteria may indicate multiple particular client devices 215 from which to receive data records.

In some implementations, the data request may include a request for a report of data records meeting the criteria. Additionally, or alternatively, the data request may include a request for an alert when a data record, meeting the criteria, is gathered. For example, data request may be a one-time request for a single alert or a single report of data records. Additionally, or alternatively, the data request may include a recurring request for multiple alerts each time that a data record, meeting the criteria, is gathered. Additionally, or alternatively, the data request may include a recurring request for multiple reports of data records to be provided at recurring intervals (e.g., one report per day, per week, per month, etc.).

In some implementations, the communication request may include a control instruction to be provided to client device 215 (e.g., an instruction to adjust a sensor/metering device of client device 215, to adjust how data is gathered by client device 215, etc.). Additionally, or alternatively, the communication request may include updates to provisioning information associated with client device 215, (e.g., updates to transmission policies, processing instructions, and/or devices authorized to communicate with client device 215). Additionally, or alternatively, the communication request may include some other communication/request associated with client device 215 and related to data records formed by client device 215.

Process 600 may also include authorizing the user device (block 620). For example, CSP 230 may authorize user device 210 to receive data records (e.g., when the communication request includes a data request). Additionally, or alternatively, CSP 230 may authorize user device 210 to provide a control instruction and/or a management instruction to client device 215 when the communication request includes the control instruction and/or the management instruction. Additionally, or alternatively, CSP 230 may authorize user device 210 to provide another type of communication to client device 215.

In some implementations, CSP 230 may authorize user device 210 based on the authorization related information included in the communication request (e.g., information identifying a user ID, a device ID, a geographic location, biometrics data, etc.). In some implementations, CSP 230 may authorize user device 210 to communicate with client device 215 when the authorization related information included in the communication request matches the information stored by client device information field 510. In some implementations (e.g., when some of the information in the communication request matches the information stored by client device information field 510), CSP 230 may allow partial access to client device 215 (e.g., to allow user device 210 to receive a particular subset of data gathered by client device 215) or may deny access to client device 215 completely.

In some implementations, CSP 230 may authorize user device 210 based on information stored by transmission instructions field 540. For example, CSP 230 may identify whether user device 210 is authorized to receive data records requested by user device 210. For example, a particular user device 210 may be authorized to receive data records associated with a data request having a particular complexity measurement (e.g., based on a subscription level and/or permission level of user device 210). In some implementations, CSP 230 may authorize user device 210 to receive a portion of data records associated with a data request (e.g., when user device 210 is authorized to receive only the portion of the data records). In some implementations, CSP 230 may authorize user device 210 to receive data records based on a time of day and/or based on payment authorization information.

In some implementations, CSP 230 may authorize user device 210 to provide a control instruction, a management instruction, and/or provisioning update information based on information stored by client device information field. For example, as described above, client device information field 510 may store information that identifies authorization information for user devices 210 that may provide particular control instructions, particular management instructions, and/or provisioning update information.

Process 600 may also include providing the communication request to a centralized app device (block 630). For example, CSP 230 may provide the communication request to centralized app device 225 based on authorizing user device 210. In some implementations, central app server 225 may receive the communication request and may communicate with one or more app devices 220 to process the communication request.

As an example, assume that the communication request includes a request for data records meeting particular criteria. Given this assumption, central app server 225 may identify data records meeting the particular criteria in the communication request to form processed data. In some implementations, the processed data may include a report of data records meeting the criteria and/or an alert when client device 215 gathers a data record that meets the criteria. In some implementations, central app server 225 may provide the processed data to CSP 230.

As another example, assume that the communication request includes a control instruction and/or a management instruction for client device 215. Given this assumption, central app server 225 may provide the control instruction and/or management instruction to client device 215 on behalf of user device 210. In some implementations, central app server 225 may provide a response to indicate that client device 215 has received the control instruction and/or the management instruction.

Process 600 may further include receiving data from the centralized app device (block 640). For example, CSP 230 may receive data, corresponding to the communication request, from central app server 225 based on providing the communication request to central app server 225. In some implementations, the data may include a response to the communication request. For example, the data may include data records meeting particular criteria (e.g., when the communication request includes a request for data meeting the particular criteria). In some implementations, the data may correspond to a one-time request for data records meeting particular criteria, a recurring request for data records meeting particular criteria, and/or data records associated with an alarm.

In some implementations, the data may include an indication that client device 215 has received and/or executed the control instruction, the management instruction, and/or the updated provisioning information (e.g., when the communication request includes a control instruction, a management instruction, and/or updated provisioning information). In some implementations, the data may include some other information corresponding to a response to the communication request.

Process 600 may also include providing the data to the user device (block 650). For example, CSP 230 may provide the data to user device 210 based on receiving the data from central app server 225. In some implementations, central app server 225 may encrypt the data and may provide the data via a secure channel to prevent an unauthorized device from receiving the data.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel. Also, in some implementations, of the blocks may be omitted. For example, blocks 630-650 may be omitted when a communication request includes only provisioning update information and CSP 230 re-provisions client device 215 independently of central app server 225.

Figure 7:
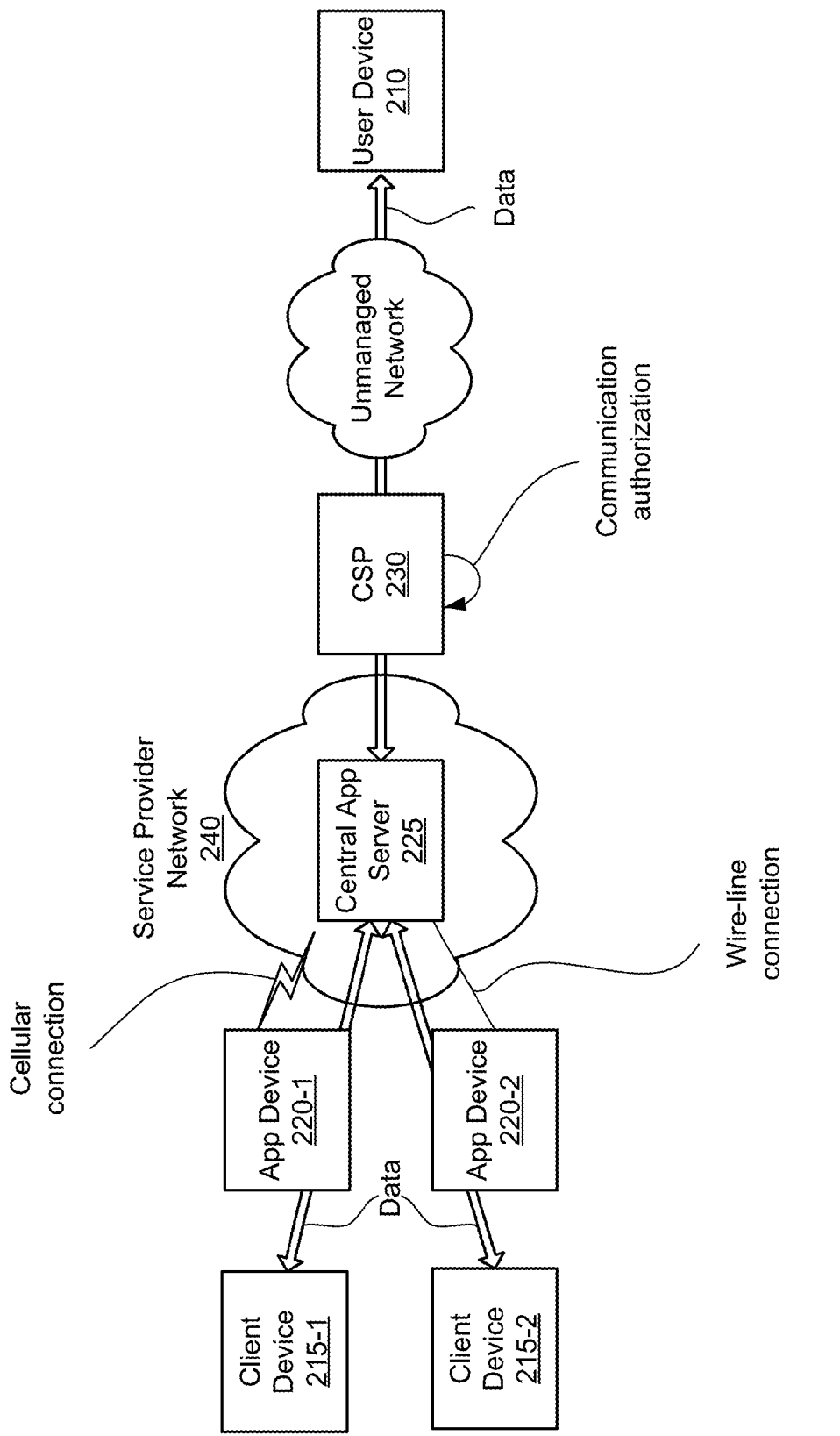
FIG. 7 illustrates an example implementation as described herein.

FIG. 7 illustrates an example implementation as described herein. As shown in FIG. 7, CSP 230 may facilitate the communication of data flows between user device 210, client device 215-1 and client device 215-2. For example, CSP 230 may receive a communication request from user device 210 via an unmanaged network, authorize user device 210 to communicate with client device 215-1 and client device 215-2 (e.g., to receive data records associated with client device 215-1 and/or client device 215-2, provide a control instruction, a management instruction, provisioning update information, and/or provide some other communication to client device 215-1 and client device 215-2), and transmit data to/from user device 210, client device 215-1, and client device 215-2 (e.g., in accordance with process 600 as described above). As further shown in FIG. 7, central app server 225 may receive and/or store data records formed by client device 215-1 and client device 215-2. Further, central app server 225 may receive and/or store processed data formed by app device 220-1 and app device 220-2. Also, central app server 225 may connect with client device 215-1, client device 215-2, app device 220-1, and/or app device 220-2 via a cellular connection and/or via a wire-line connection associated with service provider network 240. As a result, client device 215-1, client device 215-2, app device 220-1, app device 220-2, central app server 225 may not be directly accessible by user device 210, thereby increasing security while still permitting user device 210 to communicate with client device 215-1, client device 215-2 (e.g., to receive data records, provide control instructions, provide management instructions, provide provisioning update information, or communicate with client device 215 for some other purpose).

While a particular example is shown in FIG. 7, the above description is merely an example implementation. In practice, other examples are possible from what is described above in FIG. 7.

As described above, client device 215 may not be directly accessible from an unmanaged network, thereby providing a layer of security for client device 215. For example, client device 215 may be accessed via service provider network 240 which user device 210 may access via CSP 230. In some implementations, CSP 230 may transmit data flows to/from client device 215 (e.g., provisioning information, control instructions, data gathered by client device 215, etc.). As a result, CSP 230 may provide secure access to client device 215 and may concurrently provision multiple client devices 215, thereby reducing labor and costs associated with separately provisioning tens of thousands to millions of client devices 215.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a server, provisioning information for a client device of one or more client devices,
   the provisioning information including a transmission policy associated with a class of data of one or more classes of data,
   each class of data, of the one or more classes of data, corresponding to:
   a particular sensor, of one or more sensors, of the client device, and
   a particular transmission instruction for transmitting data gathered at the client device,
   the particular transmission instruction identifying:
   an interval at which the data, gathered at the client device, is to be transmitted, and
   at least one of:
   a time at which the data, gathered at the client device, is to be transmitted,
   a recipient to receive or access the data gathered at the client device, or
   whether the data, gathered at the client device, is to be provided based on receiving a request or provided automatically, and
   each of the one or more client devices being associated with respective provisioning information;
   provisioning, by the server and based on receiving the provisioning information, the client device to prepare the client device to gather data, to form a data record, and to communicate information relating to the data record with a user device via the server;
   receiving, by the server, a communication request from the user device via a first network,
   the communication request including a request for:
   transmitting the information relating to the data record to the client device, or
   receiving the information relating to the data record from the client device;
   communicating, by the server and based on receiving the communication request, with an app device via a central app server of a second network, to process the communication request,
   the data gathered at the client device being processed by the app device,
   the data record and the processed data being stored by the central app server, and
   the second network being different from the first network; and
   providing, by the server, a response to the communication request to the user device,
   the response to the communication request including the information relating to the data record.

2. The method of claim 1, where the second network is a service provider network associated with the client device or the server, and
   where the method further comprises:
   regulating access to the service provider network or the client device by the user device.

3. The method of claim 1, where the client device is a machine-to-machine (M2M) device.

4. The method of claim 1, where communicating with the app device via the central app server comprises:
   providing the communication request, to the central app server, to cause the central app server to communicate with the app device, and receiving, from the central app server, the response to the communication request based on providing the communication request; and where providing the response to the user device comprises:
providing the response to the user device based on receiving the response from the central app server.

5. The method of claim 1, where communicating with the app device is based on authorizing the user device.

6. The method of claim 1, where the information relating to the data record includes a control instruction to adjust a sensor or metering device used to gather the data to form the data record.

7. The method of claim 1, where the information relating to the data record includes information identifying authorized users, authorized to communicate with the client device, to receive the data record.

8. The method of claim 1, where the information relating to the data record includes a transmission instruction that identifies quality of service policies for a bearer, used to transmit the data record, or information identifying application devices to receive the data record to process the data record.

9. A system comprising:
a server including a processor; and
a memory storing instructions that, when executed by the processor, cause the processor to:
receive provisioning information for a client device of one or more client devices,
the provisioning information including a transmission policy associated with a class of data of one or more classes of data,
each class of data, of the one or more classes of data,
corresponding to:
a particular sensor, of one or more sensors, of the client device, and
a particular transmission instruction for transmitting data gathered by the client device,
the particular transmission instruction identifying:
an interval at which the data, gathered by the client device, is to be transmitted, and
at least one of:
a time at which the data, gathered by the client device, is to be transmitted,
a recipient to receive or access the data gathered by the client device, or
whether the data, gathered by the client device, is to be provided based on receiving a request or provided automatically, and
each of the one or more client devices being associated with respective provisioning information;
provision, based on receiving the provisioning information, the client device to prepare the client device to gather data for a data record and communicate information relating to the data record with a user device via the server;
receive a communication request from the user device via a first network,
the communication request including a request to:
transmit the information relating to the data record to the client device, or
receive the information relating to the data record from the client device;
authorize the user device based on receiving the communication request;
communicate, based on receiving the communication request and authorizing the user device, with the client device, via an app device and a central app server, to process the communication request,
the data gathered by the client device being processed by the app device,
the data record and the processed data being stored by the central app server, and
the central app server being included in a second network that is different from the first network; and
provide a response to the communication request to the user device,
the response to the communication request including the information relating to the data record.

10. The system of claim 9, where the second network is a service provider network associated with the client device or the server, and
where the server is further to:
regulate access to the service provider network or to the client device by the user device.

11. The system of claim 9, where the client device is a machine-to-machine (M2M) device.

12. The system of claim 9, where the server is further to:
provide the communication request, to the central app server, to cause the central app server to communicate with the client device, and
receive, from the central app server, the response to the communication request to the server; and
where the server, when providing the response to the user device, is to:
provide the response to the user device based on receiving the response from the central app server.

13. The system of claim 9, where the information relating to the data record includes information identifying authorized users, authorized to communicate with the client device, to receive the data record.

14. The system of claim 9, where the information relating to the data record includes a control instruction to adjust a sensor or metering device used to gather the data to form the data record.

15. The system of claim 9, where the information relating to the data record includes a transmission instruction that identifies quality of service policies for a bearer, used to transmit the data record, or information identifying application devices to receive the data record to process the data record.

16. A non-transitory computer-readable medium storing instructions, the instructions comprising:
a plurality of instructions which, when executed by one or more processors associated with one or more devices, cause the one or more processors to:
receive provisioning information for a machine-to-machine (M2M) device of one or more M2M devices,
the provisioning information including a transmission policy associated with a class of data of one or more classes of data,
each class of data, of the one or more classes of data,
corresponding to:
a particular sensor, of one or more sensors, of the M2M device, and
a particular transmission instruction for transmitting data gathered by the M2M device,
the particular transmission instruction identifying:

an interval at which the data, gathered by the M2M device, is to be transmitted, and
at least one of:
a time at which the data, gathered by the M2M device, is to be transmitted,
a recipient to receive or access the data gathered by the M2M device, or
whether the data, gathered by the M2M device, is to be provided based on receiving a request or provided automatically, and
each of the one or more M2M devices being associated with respective provisioning information;
provision, based on receiving the provisioning information, the M2M device to prepare the M2M device to gather data for a data record and communicate information relating to the data record with a user device via the one or more devices;
receive a communication request from the user device via a first network,
the communication request including a request to:
transmit the information relating to the data record to the M2M device, or
receive the information relating to the data record from the M2M device;
authorize the user device based on receiving the communication request;
communicate with an app device, via a central app server of a second network, to process the communication request based on authorizing the user device,
the data gathered by the M2M device being processed by the app device,
the data record and the processed data being stored by the central app server, and
the second network being different from the first network; and
provide a response to the communication request to the user device,
the response to the communication request including the information relating to the data record.

17. The non-transitory computer-readable medium of claim 16, where the second network is a service provider network associated with the M2M device or the one or more devices,
where the plurality of instructions, when executed by the one or more processors, further cause the one or more processors to:
regulate access to the service provider network or to the M2M device by the user device.

18. The non-transitory computer-readable medium of claim 16, where the one or more devices include a first server,
where the plurality of instructions, when executed by the one or more processors, further cause the one or more processors to:
provide the communication request, to the central app server, to cause the central app server to communicate with the app device, and
receive, from the central app server, the response to the communication request based on providing the communication request, and
where the plurality of instructions, that cause the one or more processors to provide the response to the user device, cause the one or more processors to:
provide the response to the user device based on receiving the response from the central app server.

19. The non-transitory computer-readable medium of claim 16, where the information relating to the data record includes a request for the data record or a transmission instruction that identifies quality of service policies for a bearer, used to transmit the data record, or information identifying application devices to receive the data record to process the data record.

20. The non-transitory computer-readable medium of claim 16, where the information relating to the data record includes a control instruction to adjust a sensor or metering device used to gather the data to form the data record.

* * * * *